(12) United States Patent
Ryu et al.

(10) Patent No.: US 11,696,666 B2
(45) Date of Patent: Jul. 11, 2023

(54) VACUUM CLEANER

(71) Applicant: LG ELECTRONICS INC., Seoul (KR)

(72) Inventors: Jungwan Ryu, Seoul (KR); Jinhyouk Shin, Seoul (KR); Kookhaeng Lee, Seoul (KR); Dae Ho Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 332 days.

(21) Appl. No.: 16/985,267

(22) Filed: Aug. 5, 2020

(65) Prior Publication Data

US 2021/0161345 A1  Jun. 3, 2021

(30) Foreign Application Priority Data

Nov. 29, 2019 (KR) .................. 10-2019-0157392

(51) Int. Cl.
*A47L 9/20* (2006.01)
*A47L 9/10* (2006.01)
(Continued)

(52) U.S. Cl.
CPC ............. *A47L 9/20* (2013.01); *A47L 9/102* (2013.01); *A47L 9/1409* (2013.01); *A47L 9/1616* (2013.01); *A47L 9/30* (2013.01)

(58) Field of Classification Search
None
See application file for complete search history.

(56) References Cited

U.S. PATENT DOCUMENTS

2016/0183753 A1   6/2016  Makarov et al.
2018/0043044 A1*  2/2018  Hachiya .............. A61L 2/26
(Continued)

FOREIGN PATENT DOCUMENTS

CN    102433608 A    6/2012
CN    108742234 A    11/2018
(Continued)

OTHER PUBLICATIONS

KR1019980066065 English trans (Year: 1998).*
(Continued)

*Primary Examiner* — Brian D Keller
(74) *Attorney, Agent, or Firm* — Birch, Stewart, Kolasch & Birch, LLP

(57) ABSTRACT

A vacuum cleaner includes a body having a space that allows air to flow therethrough. The vacuum cleaner also includes a suction inlet configured to introduce the air into the body. Further, the vacuum cleaner includes a suction motor provided in the body. The vacuum cleaner includes a dust separation module provided in the body. The dust separation module is arranged between the suction inlet and the suction motor. The dust separation module separates foreign substances from the air. The vacuum cleaner includes an exhaust module that discharges the air passing through the suction motor from the body. The exhaust module includes an exhaust filter comprising a photocatalyst. Further, the vacuum cleaner includes a lighting module that radiates light toward the exhaust filter. The vacuum cleaner includes a battery supplying electrical energy for the operation of the vacuum cleaner and a controller configured that controls operations of the vacuum cleaner.

17 Claims, 14 Drawing Sheets

(51) Int. Cl.
*A47L 9/30* (2006.01)
*A47L 9/16* (2006.01)
*A47L 9/14* (2006.01)

(56) References Cited

U.S. PATENT DOCUMENTS

2020/0197550 A1* 6/2020 Barron ................... A61L 2/084
2022/0040357 A1* 2/2022 De Campo ............ B01J 19/127

FOREIGN PATENT DOCUMENTS

| | | |
|---|---|---|
| CN | 209238004 U | 8/2019 |
| JP | 2006-217941 A | 8/2006 |
| KR | 10-1998-0066065 A | 10/1998 |
| KR | 10-2007-0105804 A | 10/2007 |
| KR | 10-2018-9078201 A | 7/2018 |
| KR | 10-2019-0091842 A | 8/2019 |
| KR | 10-20373290000 B1 | 10/2019 |
| KR | 10-2019-0127652 | 11/2019 |
| TW | 201424666 A | 7/2014 |
| TW | 201932061 A | 8/2019 |

OTHER PUBLICATIONS

KR1020180078201—Cleaner Engl Trans (Year: 2018).*
International Search Report, dated Sep. 1, 2020, issued in International Application No. PCT/KR2020/007097 (3 pages).
Taiwanese Office Action, dated Feb. 24, 2021, issued in Taiwanese Application No. 1091123951 (16 pages).

* cited by examiner

VACUUM CLEANER

CROSS-REFERENCE TO RELATED APPLICATION

Pursuant to 35 U.S.C. § 119(a), this application claims the benefit of an earlier filing date of and the right of priority to Korean Application No. 10-2019-0157392, filed on Nov. 29, 2019 in the Republic of Korea, the contents of which are incorporated by reference herein in their entirety.

BACKGROUND

1. Technical Field

The present disclosure relates to a vacuum cleaner. More particularly, the present disclosure relates to a vacuum cleaner that is hygienically managed by periodically disinfecting a filter thereof.

2. Description of Related Art

A vacuum cleaner is a device that suctions foreign substances such as dust together with surrounding air, and separates and stores the foreign substances from the air.

Accordingly, the vacuum cleaner is based on the generation of a suction force, and has a structure in which foreign substances are separated from suctioned air while the suctioned air flows along a predetermined path. Accordingly, the vacuum cleaner has a motor-related component for generating a large suction force, air flow path and filter components for separating the foreign substances from the suctioned air, and a component for exhausting the filtered.

As a body of the vacuum cleaner is miniaturized, parts of the vacuum cleaner for suctioning air, separating foreign substances from the suctioned air, and storing the foreign substances are complicatedly arranged in a small space. Accordingly, it is difficult to clean the inside of body of the vacuum cleaner, and disassemble the vacuum cleaner.

Only removing dust collected in the vacuum cleaner is insufficient to manage hygiene conditions of the inside of the vacuum cleaner. The vacuum cleaner is provided with several filters for filtering dust. In addition to the dust, various bacteria grow in the filters. Even if a sufficient portion of the lifespan of the filter remains, the bacteria could contaminate the inside of the filter.

As related art, Korean Patent Application Publication No. 10-2019-0127652 (hereinafter referred to as "related art 1") discloses a vacuum cleaner.

The vacuum cleaner according to related art 1 includes a suction inlet, a first cyclone, a second cyclone, a suction motor, a prefilter, an exhaust filter, and a flow guide. In the vacuum cleaner according to related art 1, a filter mechanism is installed in a passage through which air is discharged from a body of the vacuum cleaner to the outside. The filter mechanism includes an exhaust filter therein, and air discharged to the outside is filtered through the exhaust filter.

The vacuum cleaner according to related art 1 filters the exhausted air by using the exhaust filter. The exhaust filter can be replaced after being used for its predetermined lifespan. However, depending on the environment in which the vacuum cleaner is used, various bacteria can grow in the exhaust filter. A user can only check the predetermined lifespan of the filter, and there is no way to detect the degree of bacteria growing in the exhaust filter. The only measure for maintaining hygiene is to frequently separate the exhaust filter from the vacuum cleaner and disinfect the exhaust filter by sunlight.

The above-described background technology is technical information that the inventors hold for the derivation of the present disclosure or that the inventors acquired in the process of deriving the present disclosure. Thus, the above-described background technology may not necessarily be regarded as known technology disclosed to the general public prior to the filing of the present application.

SUMMARY OF THE INVENTION

One aspect of the present disclosure is to address an issue associated with some related art in which bacteria cannot be prevented from growing in a filter mounted in a vacuum cleaner.

Another aspect of the present disclosure is to address an issue associated with some related art in which managing the vacuum cleaner is inconvenient due to a complicated process required when separating the filter from the vacuum cleaner so as to disinfect the filter, and it is necessary to periodically separate the filter from the vacuum cleaner and disinfect the filter.

Still another aspect of the present disclosure is to address an issue associated with some related art in which the filter is easily contaminated unless a user pays special attention.

Still another aspect of the present disclosure is to address an issue associated with some related art in which surplus electrical energy is not utilized in the process of charging the battery.

The present disclosure is not limited to what has been described above, and other aspects not mentioned herein will be apparent from the following description to one of ordinary skill in the art to which the present disclosure pertains.

A vacuum cleaner according to an embodiment of the present disclosure may include a suction inlet, a body, a suction motor, a dust separation module, an exhaust module, and a lighting module. The suction inlet may be an inlet through which air is introduced. The body may form a space in which air introduced through the suction inlet flows. The suction motor may be provided in the body. The dust separation module may be provided in the body and arranged between the suction inlet and the suction motor based on a movement path of air, and may separate foreign substances from flowing air.

The exhaust module may discharge air passing through the suction motor to the outside of the body, and may be provided with at least one exhaust filter including a photocatalyst. The lighting module may be provided in the body, and may radiate light toward the exhaust filter.

The body may include a motor housing. The motor housing may form a predetermined space therein so as to form a path through which air flows, and may accommodate the suction motor. Air passing through the dust separation module may rise upward along an outer surface of the motor housing and move to the inside of the motor housing toward the suction motor.

The body may include a flow guide. The flow guide may be coupled to the outside of the motor housing, and may form a path through which air can flow between the outer surface of the motor housing and the flow guide.

The flow guide may include a flow path forming wall, a protrusion, and an inlet. The flow path forming wall may form a space therein so as to divide a space between the body and the motor housing. The protrusion may form a part of the flow path forming wall, and protrude outward so as to form at least two air flow paths in the flow path forming wall.

The inlet may form a valley between the protrusion and the protrusion so as to form a flow path of air between the flow guide and the body.

The lighting module may be coupled to the outside of the flow guide, and may radiate light toward an intake port of the exhaust module from a lower portion of the exhaust module.

The lighting module may include a lighting frame, a protruding coupling portion, an inlet coupling portion, and a light irradiator.

The inlet coupling portion may further include a fastening member. The fastening member may be coupled to the inlet of the flow guide.

The exhaust filter may include a visible light photocatalyst.

The exhaust module may include a basic filter and the exhaust filter. The basic filter may be a HEPA filter. The basic filter and the exhaust filter may be stacked on each other.

The exhaust filter may be arranged on a lower portion of the basic filter.

A vacuum cleaner according to another embodiment of the present disclosure may include a body, a dust separation module, an exhaust module, an exhaust filter, and a lighting module. The body may be provided with a suction motor, and may suction surrounding air. The dust separation module may be provided in the body, and may separate foreign substances from air suctioned into the body. The exhaust module may discharge air passing through the dust separation module and the suction motor in the body to the outside of the body. The exhaust filter may be provided in the exhaust module, and may remove foreign substances and include a photocatalyst. The lighting module may be provided in the body, and may radiate light toward the exhaust filter.

A vacuum cleaner according to another embodiment of the present disclosure may include a body, a dust separation module, an exhaust module, a lighting module, a battery, and a controller. The battery may supply electrical energy to the suction motor, the dust separation module, and the lighting module. The controller may control operations of the suction motor, the dust separation module, the lighting module, and the battery.

The controller may turn on the lighting module at predetermined time intervals while the battery is being charged.

According to the present disclosure, the exhaust filter may be automatically disinfected through the visible light photocatalyst and lighting module, thereby allowing hygienic management of the filter.

According to the present disclosure, bacterial growth in the exhaust filter may be prevented without separating the exhaust filter from the vacuum cleaner.

According to the present disclosure, light may be automatically radiated toward the exhaust filter including the photocatalyst, thereby reducing inconvenience and enabling the filter to be kept clean even without requiring the special attention of the user.

According to the present disclosure, the exhaust filter may be disinfected by radiating light at predetermined time intervals, thereby allowing continuous hygienic management of the filter.

According to the present disclosure, the filter may be disinfected by using surplus power while the vacuum cleaner is being charged, thereby saving electrical energy.

The effects of the present disclosure are not limited to those mentioned above, and other effects not mentioned can be clearly understood by those skilled in the art from the following description.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Figure 1:
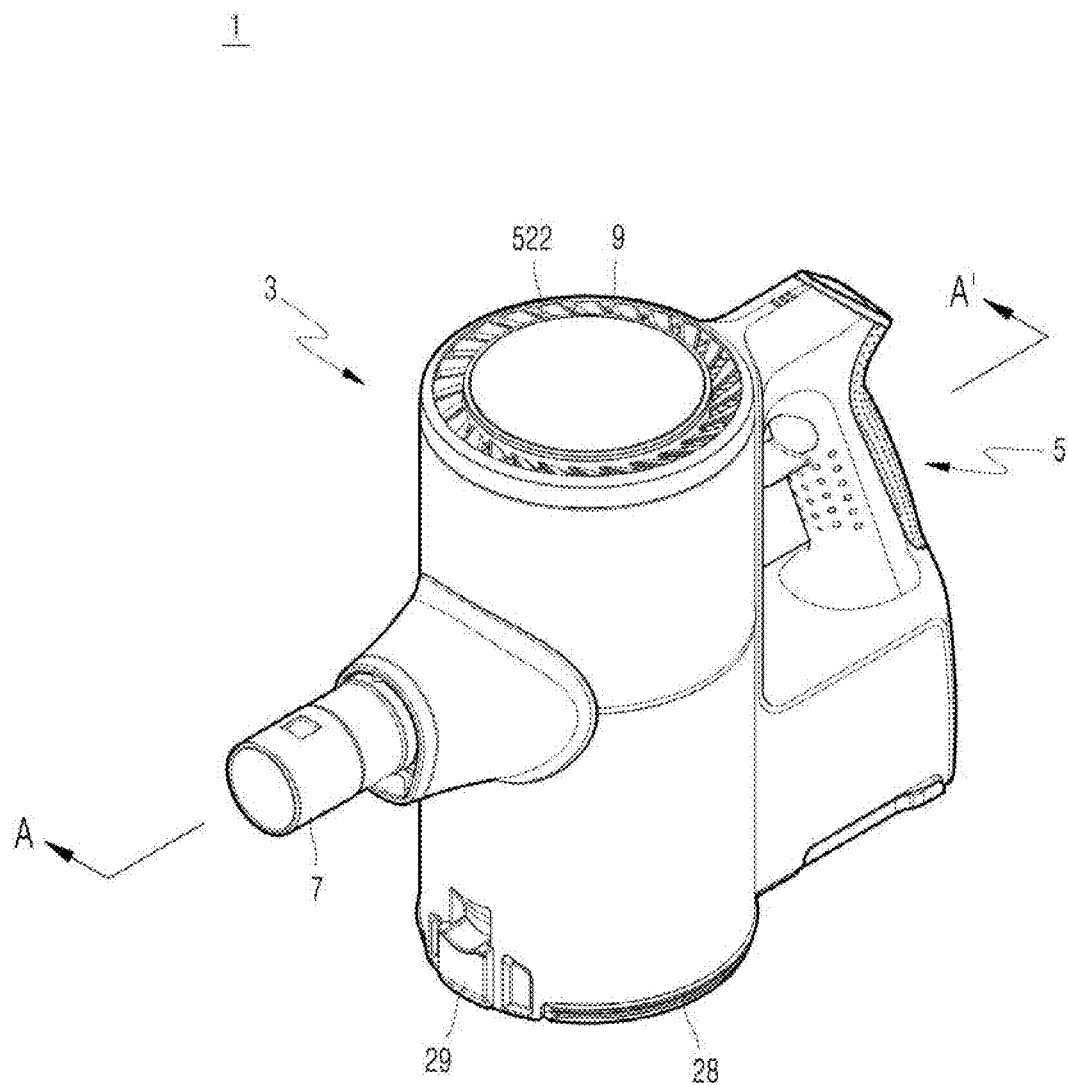
FIG. 1 is a perspective view of a vacuum cleaner according to an embodiment of the present disclosure.

Hereinafter, embodiments disclosed for the purpose of description will be described in more detail with reference to the accompanying drawings. The same reference numerals are used to designate the same components throughout the detailed description.

FIG. 1 is a perspective view of a vacuum cleaner 1 according to an embodiment of the disclosure.

As illustrated in FIG. 1, the vacuum cleaner 1 according to an embodiment of the present disclosure may include a body 3, a handle portion 5, a suction inlet 7, and an exhaust module 9.

A series of paths through which air flows may be formed in the inside of the body 3. A suction inlet 7 through which air is introduced into the body 3 may be formed at one side of the body 3. Further, the handle portion 5 may be provided on an opposite side of the suction inlet 7. In addition, the exhaust module 9 may include an exhaust port 522 coupled to an upper portion of the body 3 to discharge air introduced into the suction inlet 7 to the outside of the body 3 through the body 3.

Figure 2:
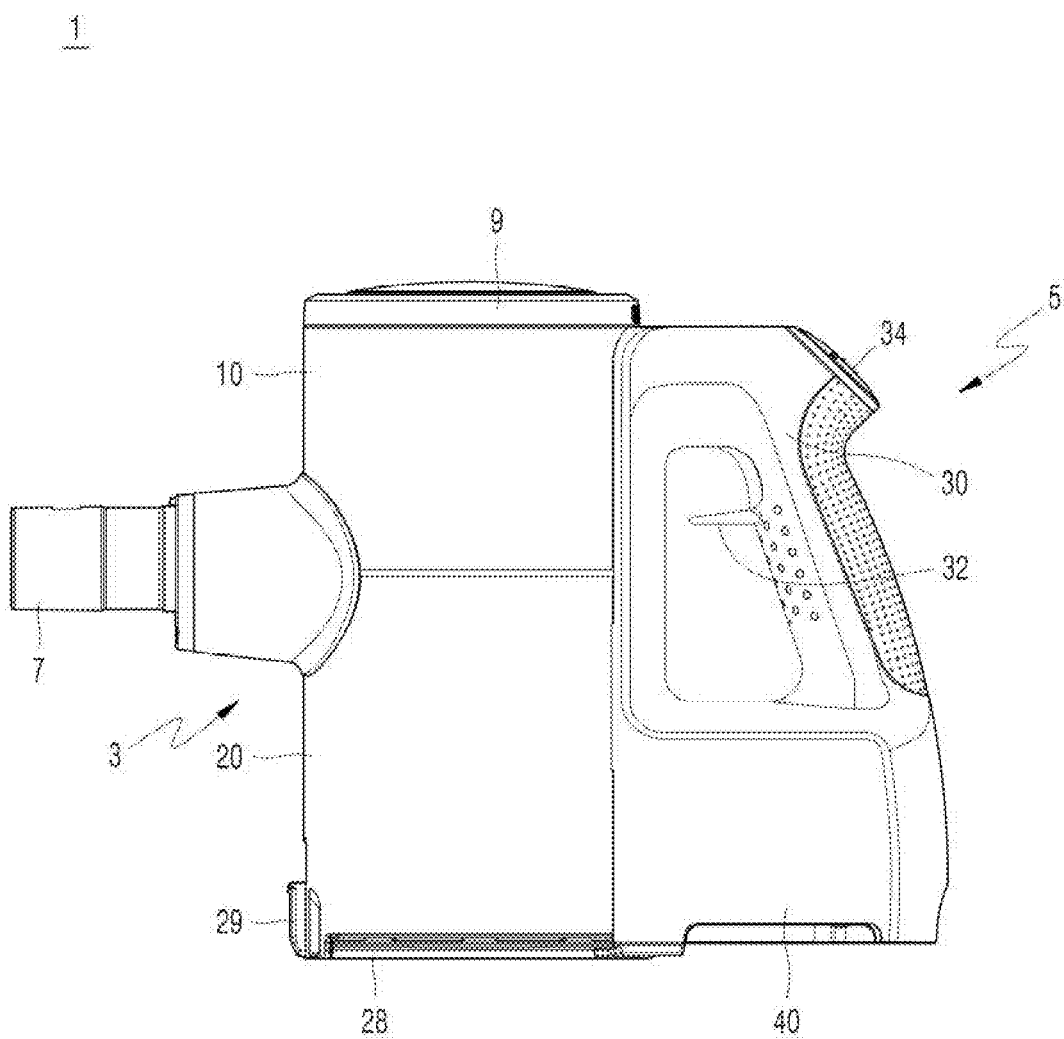
FIG. 2 is a front view of a vacuum cleaner according to an embodiment of the present disclosure.
Figure 3:
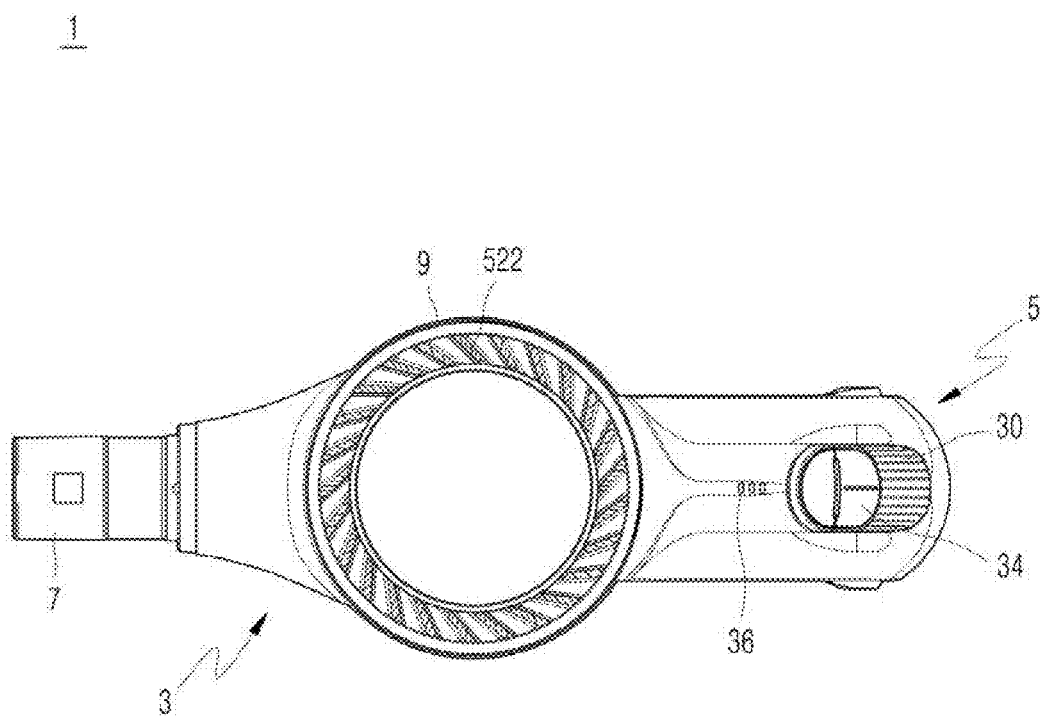
FIG. 3 is a plan view of a vacuum cleaner according to an embodiment of the present disclosure.
Figure 4:
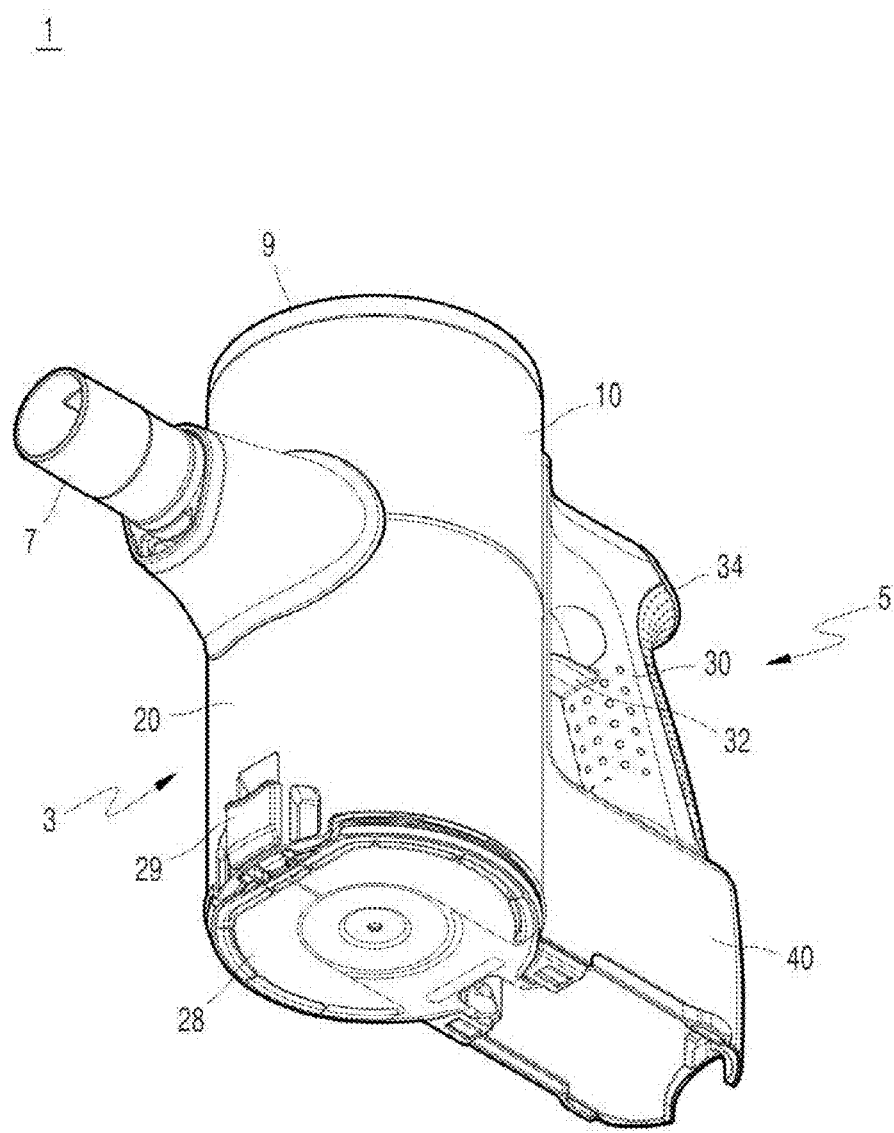
FIG. 4 is a bottom perspective view of a vacuum cleaner according to an embodiment of the present disclosure.

FIG. 2 is a front view of the vacuum cleaner 1 according to an embodiment of the present disclosure. FIG. 3 is a plan view of the vacuum cleaner 1 according to an embodiment of the present disclosure. FIG. 4 is a bottom perspective view of the vacuum cleaner 1 according to an embodiment of the present disclosure.

As illustrated in FIGS. 2 to 4, in the vacuum cleaner 1 according to an embodiment of the present disclosure, the body 3 may include a first body 10 and a second body 20. In the body 3 composed of the first body 10 and the second body 20, a predetermined space may also be formed. The body 3 may include a first space that is an inner space of the first body 10 and a second space that is an inner space of the second body 20. Such dividing of the inner space of the body 3 into the first space and the second space is for the purpose of describing an embodiment of the present disclosure, and the inner space of the body 3 is not divided in a functional manner. However, the first space is positioned above the second space, and the second space is positioned below the first space. Accordingly, air introduced through the suction inlet 7 may move to the first space through the second space.

The suction inlet 7 may be provided on one side of the body 3, and may be open in a direction away from the body 3. The suction inlet 7 may be coupled to an accessory for suctioning and cleaning. The suction inlet 7 may suction air from an open end thereof or the accessory for suctioning and cleaning coupled to the suction inlet 7, and an extension part coupled to the suction inlet 7 may be provided with components for assisting cleaning at an end thereof. The suction inlet 7 may guide the suctioned air into the body 3. The handle portion 5 may be formed on an opposite side of the body 3 that faces the suction inlet 7 with respect to the body 3. The handle portion 5 may include a handle 30, a movement limiter 32, an operation interface 34, and a display 36. The handle 30 may have a grip shape such that a user can grip the handle 30. The movement limiter 32 may be provided in the handle 30 to restrain the user's finger or body part so that the user's hand gripping the handle 30 does not slip. The operation interface 34 may be provided in the handle 30, and may be formed to allow the user to enter a predetermined command while holding the handle 30. The display 36 may be provided on an upper portion of the handle 30, and may display information related to an operating state of the vacuum cleaner 1 for the user.

The exhaust module 9 may be coupled to the upper portion of the body 3. The exhaust module 9 may form an upper surface of the body 3, and may be a passage through which air introduced into the body 3 through the suction inlet 7 is discharged to the outside of the body 3. The exhaust module 9 may include a plurality of exhaust ports 522 through which air is discharged to the outside of the body 3. The exhaust ports 522 may be open toward an upper direction of the body 3 with respect to the body 3.

Figure 5:
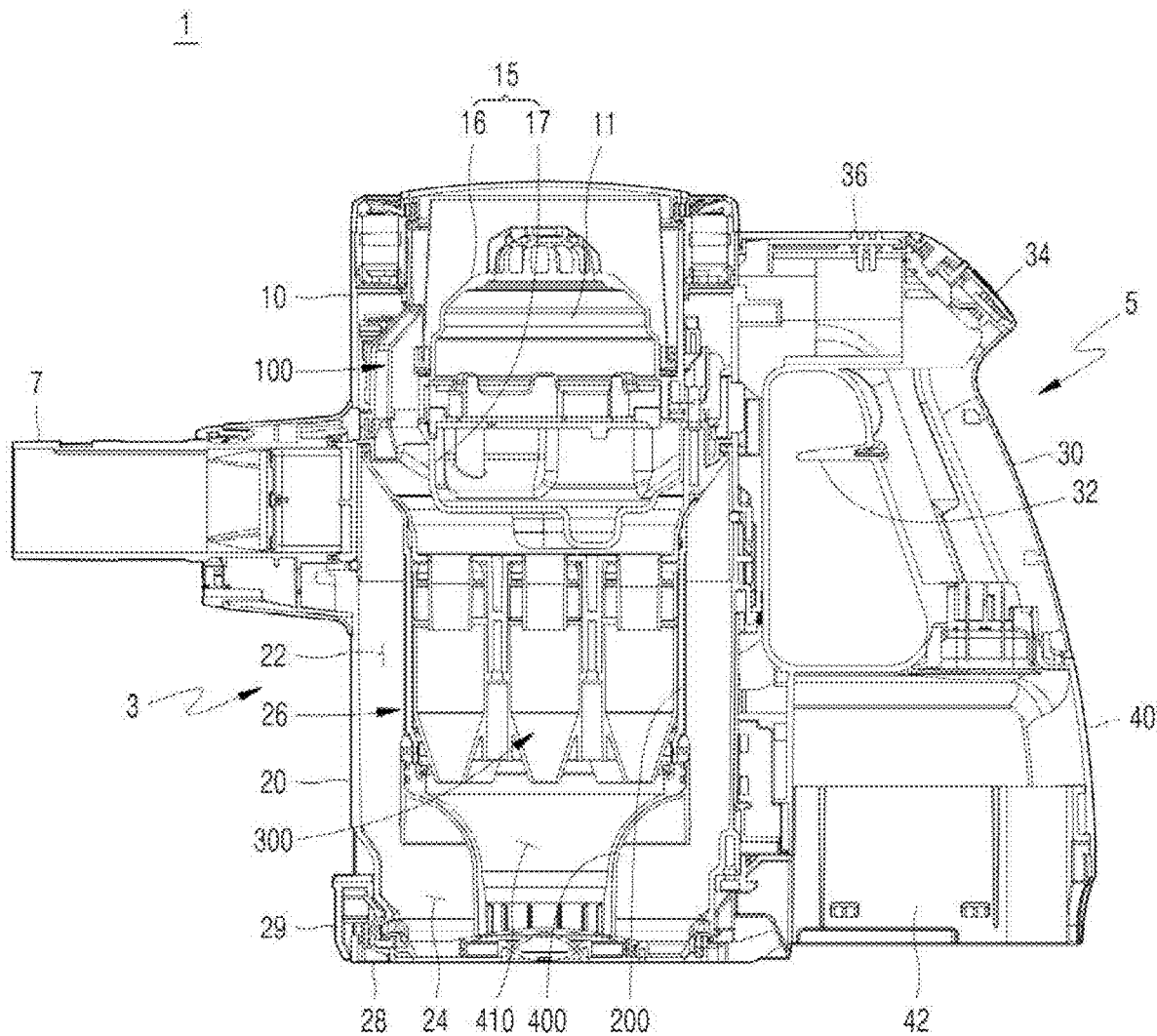
FIG. 5 is a cross-sectional view taken along line A-A' of FIG. 1.

FIG. 5 is a cross-sectional view taken along line A-A' of FIG. 1.

As illustrated in FIG. 5, the body 3 of the vacuum cleaner 1 according to an embodiment of the present disclosure may include a suction motor 11, a motor housing 15, a flow guide 100, and a dust separation module 26.

Air suctioned through the suction inlet 7 may be guided to the second space. The second space may include a first cyclone 22 that filters foreign substances from the air introduced through the suction inlet 7, and a first storage 24 in which the foreign substances filtered by the first cyclone 22 fall and are collected. The dust separation module 26 may be arranged in the second space, and the dust separation module 26 may suction air from the first cyclone 22, and may filter foreign substances through the filter unit 200.

Accordingly, the air introduced into the suction inlet 7 may move to the first cyclone 22. In the first cyclone 22, the foreign substances may be first filtered by the filter unit 200, and then may fall to the first storage 24. Air passing through the filter unit 200 and introduced into the dust separation module 26 may be introduced into the second cyclone 300.

The second cyclone 300 may include a cyclone array 320, a cyclone base 330, and a storage unit 400.

The filter unit 200 may surround an outer circumference of the second cyclone 300. The filter unit 200 may include a filter frame 210 and a main filter 220. The main filter 220 may be coupled to the filter frame 210, and thus an outer shape thereof may be formed. Further, the main filter 220 may be formed of a surface provided with a plurality of holes of a predetermined size. Alternatively, the main filter 220 may be in the form of a mesh. The filter unit 200 may be formed in a hollow cylindrical shape, and may be fitted to the second cyclone 300 by sliding in a longitudinal direction of the cylindrical shape.

The second cyclone 300 may include the cyclone array 320 and the cyclone base 330. The cyclone array 320 may be composed of a plurality of cyclone cones. The cyclone cones may each be rotatably coupled to the cyclone base 330. The cyclone cones each may have a diameter that becomes gradually smaller downward. The cyclone base 330 may be rotated with respect to the center thereof, and the plurality of cyclone cones coupled to the cyclone base 330 may each be rotated with respect to the cyclone base 330. Accordingly, through the rotation of the cyclone base 330 and the cyclone cones, foreign substances contained in air may fall and be pushed to the edge of the dust separation module 26 by centrifugal force.

Each cyclone cone may have a wide upper portion and a narrow lower portion, and a lowermost end of each cyclone cone may have a narrow passage. Such shapes of the cyclone cones of the second cyclone 300 may prevent the foreign substances pushed out by centrifugal force after falling from being introduced back into the cyclone array 320.

Specifically, the foreign substances separated by the first cyclone 22 may be collected in the first storage 24, and the foreign substances separated from the second cyclone 300 may be stored in a second storage 410 that is an inner space of the storage unit 400.

The air that is introduced into the suction inlet 7 and passes through the first cyclone 22 and the second cyclone 300 may move to the suction motor 11 along a space formed between the flow guide 100 and the motor housing 15. The suction motor 11 may be mounted in the motor housing 15. The suction motor 11 may allow surrounding air to flow in at least one direction.

The suction motor 11 may be a brushless DC (BLDC) electric motor, which generates relatively little noise and has a long lifespan. Alternatively, the suction motor 11 may be an inverter motor capable of variably changing the speed of a motor. The suction motor 11 may be mounted in the motor housing 15 to allow air to flow in at least one direction along an air flow path formed by the motor housing 15. In the vacuum cleaner 1 according to an embodiment of the present disclosure, a suction force may be generated through the suction motor 11.

The motor housing 15 may include an upper motor housing 16 and a lower motor housing 17. The upper motor housing 16 and the lower motor housing 17 may be coupled to each other to form the motor housing 15. The suction motor 11 may be coupled to the inside of the motor housing 15, and the motor housing 15 may guide air flowing through the suction motor 11 to move along a series of paths.

The flow guide 100 may be coupled to the outside of the motor housing 15. The flow guide 100 may form a predetermined space between an outer surface of the motor housing 15 and the flow guide 100. The space formed between the flow guide 100 and the motor housing 15 may be used as a passage through which air flows.

The motor housing 15 and the flow guide 100 may be arranged in the first space, and the dust separation module 26 may be arranged in the second space.

That is, the suction force generated through the suction motor 11 may introduce air into the suction inlet 7, and the introduced air may pass through the first cyclone 22, the second cyclone 300, the flow guide 100, the inner space of the motor housing 15, and the suction motor 11. The air passing through the suction motor 11 may move to the exhaust module 9 through a space formed between an outer surface of the flow guide 100 and an inner surface of the first body 10. The air moved to the exhaust module 9 may be discharged to the outside of the body 3 through the exhaust ports 522.

Here, a body cover 28 may be provided on a lower surface of the second body. One side of the body cover 28 may be rotatably coupled to the body 3, and the body cover 28 that forms the lower surface of the second body 20 may be opened or closed by the operation of an opening and closing button 29. When the body cover 28 is closed, the first storage 24 and the second storage 410 may be isolated from the outside. Accordingly, foreign substances stored in the first storage 24 and the second storage 410 may continuously accumulate. When the body cover 28 is opened, the first storage 24 and the second storage 410 may be opened toward a lower direction of the body 3. Accordingly, when the body cover 28 is opened, the foreign substances stored in the first storage 24 and the second storage 410 may be drawn out of the body 3.

In addition, the handle portion 5 may include the handle 30, the movement limiter 32, the operation interface 34, the display 36, and a battery housing 40. The battery housing 40 may be formed on a lower portion of the handle 30, and a battery 42 may be mounted in an inner space of thereof. The battery 42 may be coupled to the inside of the battery housing 40, and may be provided to be replaceable. The battery 42 may be relatively heavy in weight. Thus, when the battery 42 is positioned at the lower portion of the handle 30, the user may be able to easily grip the handle 30 and operate the vacuum cleaner 1 according to an embodiment of the present disclosure.

Figure 6:
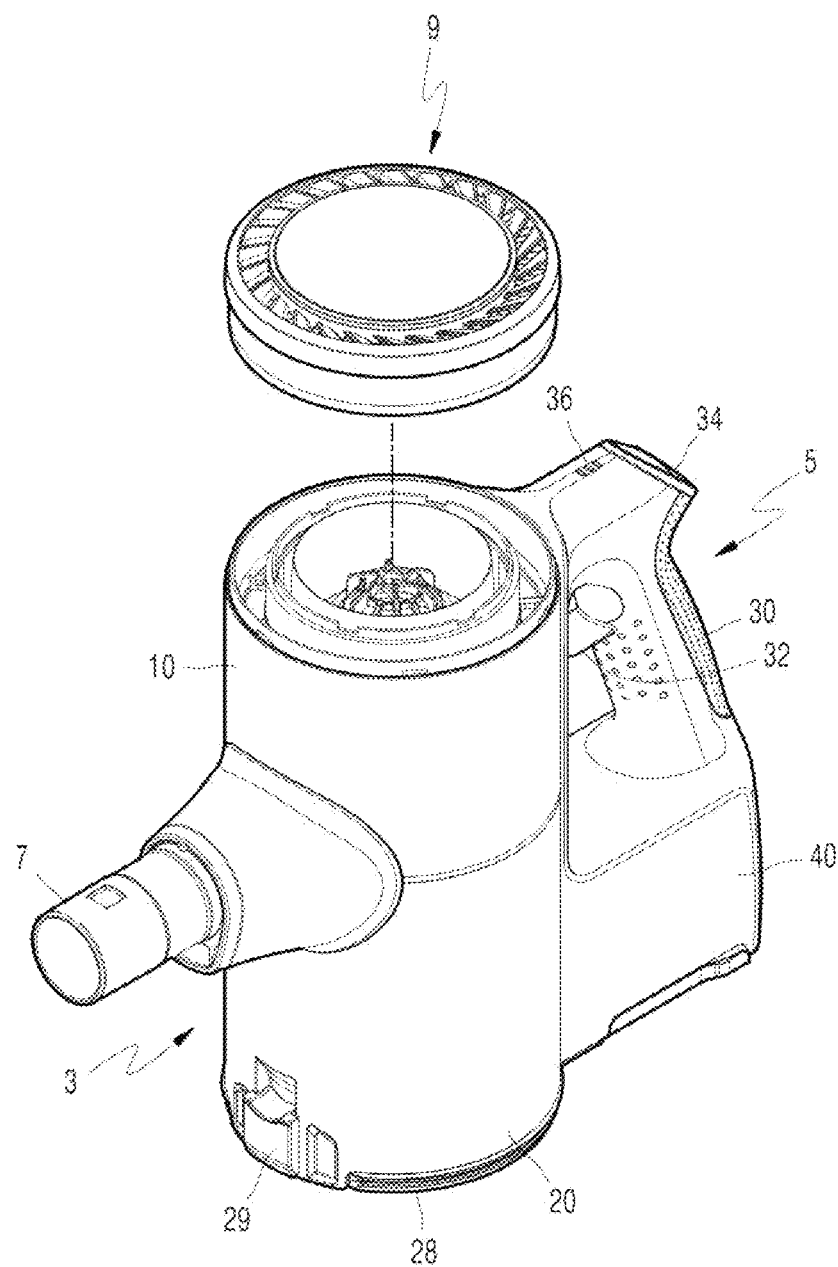
FIG. 6 is a perspective view illustrating a state in which an exhaust module is separated from a vacuum cleaner according to an embodiment of the present disclosure.
Figure 7:
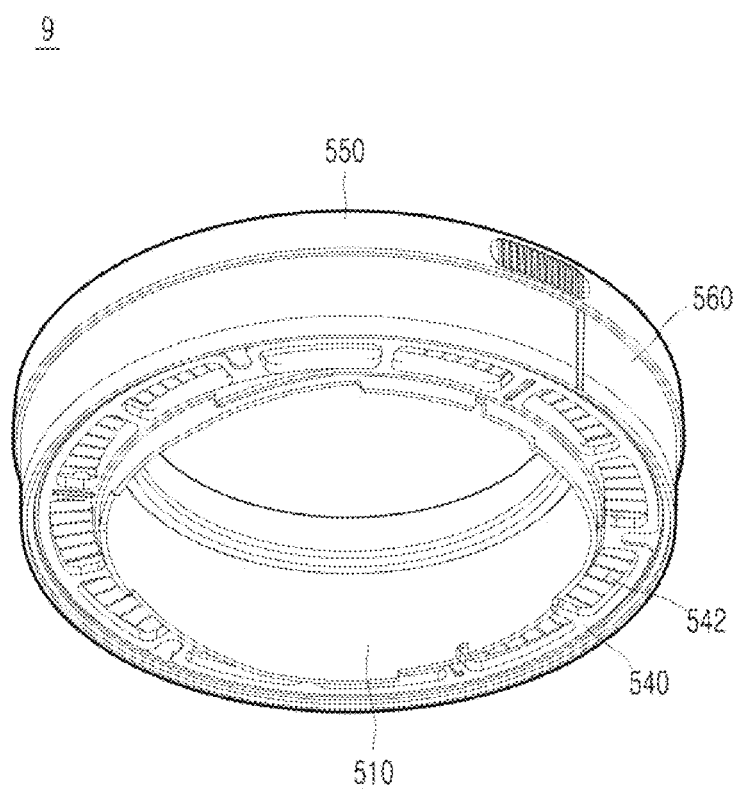
FIG. 7 is a bottom perspective view of an exhaust module in a vacuum cleaner according to an embodiment of the present disclosure.
Figure 8:
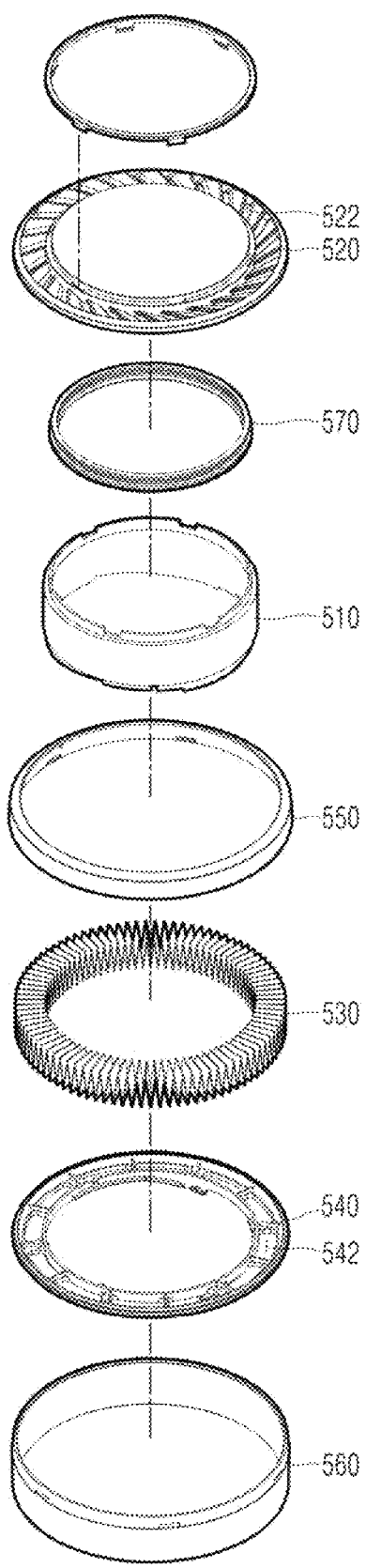
FIG. 8 is an exploded perspective view of an exhaust module in a vacuum cleaner according to an embodiment of the present disclosure.

FIG. 6 is a perspective view illustrating the exhaust module 9 separated from the vacuum cleaner 1 according to an embodiment of the present disclosure. FIG. 7 is a bottom perspective view of the exhaust module 9 in the vacuum cleaner 1 according to an embodiment of the present disclosure. FIG. 8 is an exploded perspective view of the exhaust module 9 in the vacuum cleaner according to an embodiment of the present disclosure.

As illustrated in FIGS. 6 to 7, the upper surface of the body 3 may be formed by the exhaust module 9. A plurality of intake ports 542 may be formed in a lower surface of the exhaust module 9, and a plurality of exhaust ports 522 (see FIG. 3) may be formed in an upper surface of the exhaust module 9. The intake ports 542 may introduce air discharged from the inside of the body 3 into the exhaust module 9, and the exhaust ports 522 may exhaust air to the outside of the main body 3. An exhaust filter 530 may be mounted in the exhaust module 9. The exhaust filter 530 may be arranged between the intake ports 542 and the exhaust ports 522, and air passing through the intake ports 542 and the exhaust ports 522 may pass through the exhaust filter 530.

More specifically, referring to FIG. 8, the exhaust module 9 may include a core member 510, an exhaust grill 520, an exhaust filter 530, an intake grill 540, a first frame 550, a second frame 560, and a sealing member 570.

The core member 510 may be arranged at the center of the exhaust module 9. The core member 510 may serve as a frame, and the exhaust module 9 may be assembled with the core member 510 as the center.

The exhaust filter 530 may be arranged to surround a circumference of the core member 510. The exhaust filter 530 may perform a role of filtering dust from air flowing vertically. However, such a configuration is merely exemplary, and the exhaust filter 530 may be implemented to have various functions depending on the embodiment.

The first frame 550 may be coupled to upper portions of the exhaust filter 530 and the core member 510, and the second frame 560 may be coupled to lower portions of the exhaust filter 530 and the core member 510. Here, the first frame 550 and the second frame 560 may fix not only the exhaust filter 530 and the core member 510, but also the exhaust grill 520 arranged on an upper surface of the exhaust filter 530 and the intake grill 540 arranged on a lower surface of the exhaust filter 530. The exhaust grill 520 may be provided with a plurality of exhaust ports 522, and the exhaust ports 522 may be exposed on the upper surface of the exhaust module 9. The intake grill 540 may be also provided with a plurality of intake ports 542. The intake ports 542 may be formed to be larger than the exhaust ports 522.

In addition, at least one sealing member 570 may be coupled to a coupling portion where the first frame 550 and the second frame 560 are coupled to each other. The sealing member 570 may prevent air from flowing, aside from in a predetermined path between the inside and the outside of the body 3.

The exhaust filter 530 may be subjected to a photocatalytic treatment. In an embodiment of the present disclosure, the exhaust filter 530 may be subjected to a visible light photocatalyst treatment. This enables the same effect as sunlight disinfection to be obtained when light is radiated to the exhaust filter 530. Accordingly, when light is radiated to the exhaust filter 530 through a lighting module 600 to be described below, the exhaust filter 530 may be disinfected.

In addition, the exhaust filter 530 may be stacked with the basic filter. The basic filter may be a HEPA filter, and together with the exhaust filter 530 may filter dust from exhausted air. The exhaust filter 530 may be arranged on a lower portion of the basic filter. The exhaust filter 530 may be exposed downward through the intake ports 542 formed in the intake grill 540, and the lighting module 600 may radiate light toward the intake ports 542, thereby disinfecting the exhaust filter 530.

Figure 9:
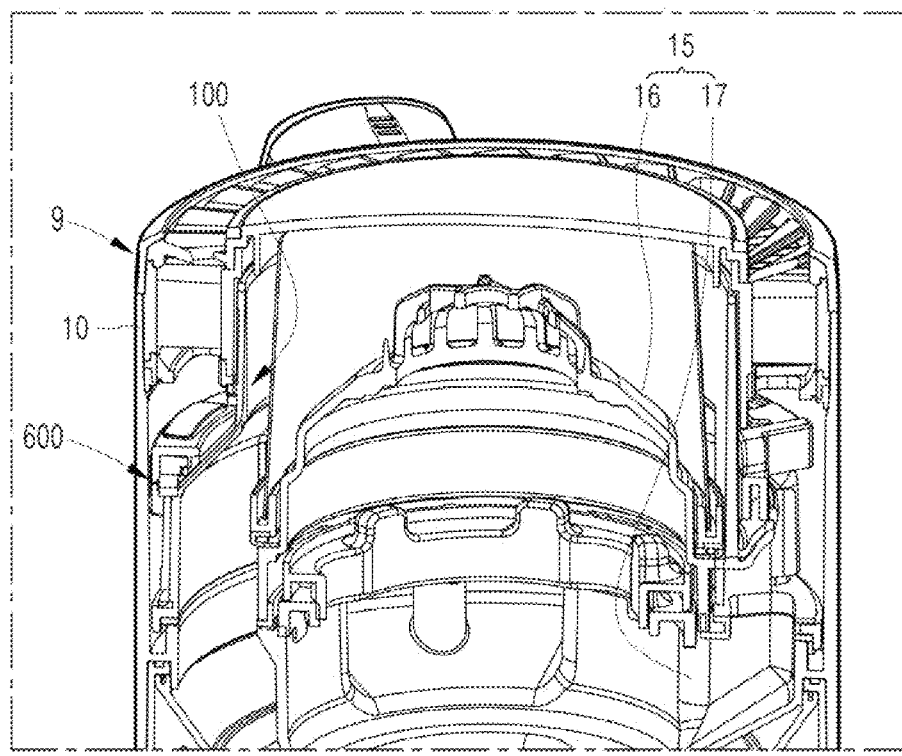
FIG. 9 is a partial cross-sectional view illustrating the inside of a body in a vacuum cleaner according to an embodiment of the present disclosure.
Figure 10:
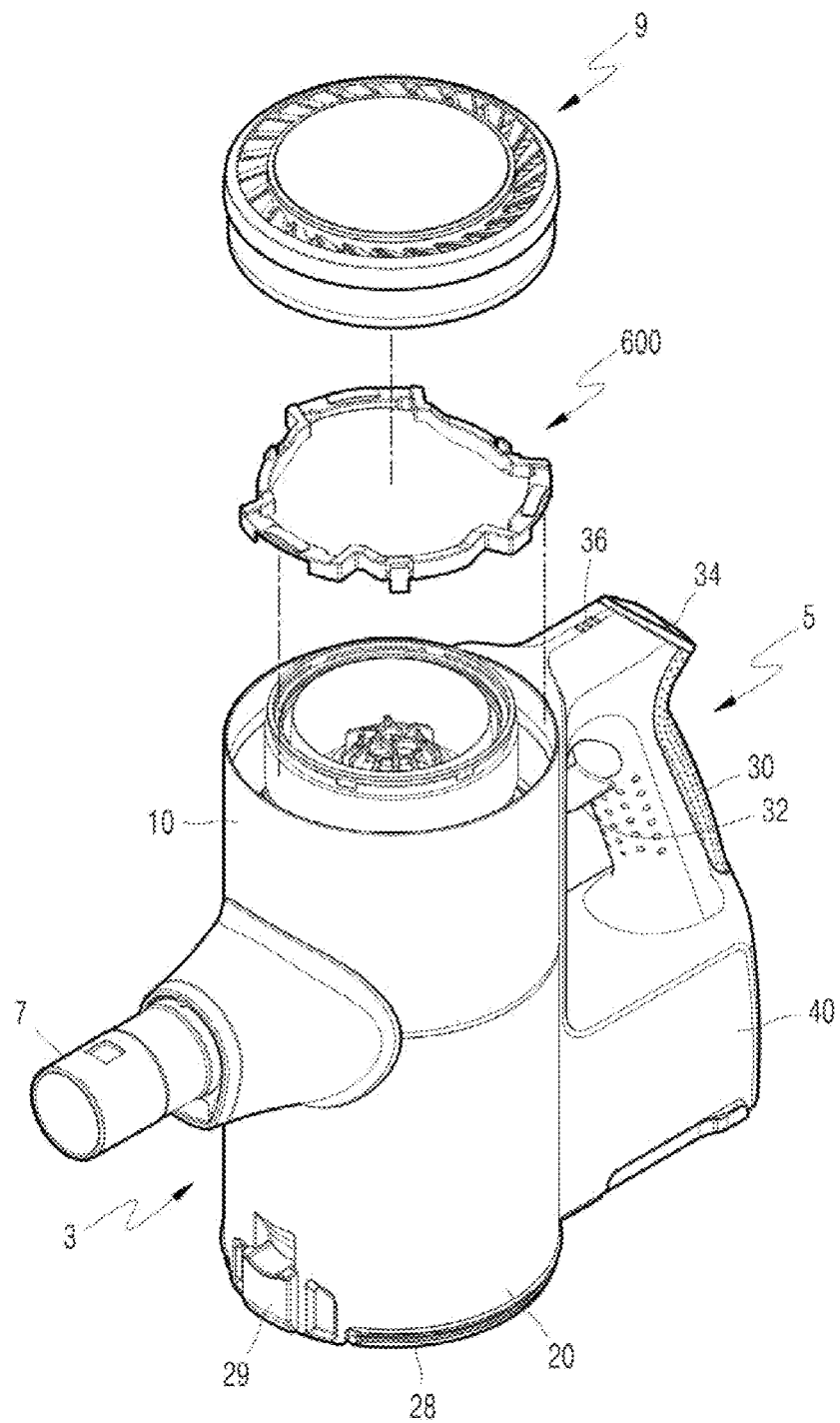
FIG. 10 is a perspective view illustrating a state in which an exhaust module and a lighting module are separated from a vacuum cleaner according to an embodiment of the present disclosure.

FIG. 9 is a partial cross-sectional view illustrating the inside of the body 3 in the vacuum cleaner 1 according to an embodiment of the present disclosure. FIG. 10 is a perspective view illustrating the exhaust module 9 and the lighting module 600 separated from the vacuum cleaner 1 according to an embodiment of the present disclosure.

As illustrated in FIGS. 9 and 10, in the body 3, the lighting module 600 may be arranged between a wall surface of the body 3 and a flow path forming wall 110 of the flow guide 100. The lighting module 600 may include a plurality of light irradiators 620 (see FIG. 11) that radiate light upward. The light irradiators 620 may radiate light toward the intake ports 542 respectively positioned above. When light is radiated from the light radiators 620 to the exhaust filter 530 through the intake ports 542, the visible light photocatalyst included in the exhaust filter 530 may react to disinfect the exhaust filter 530.

Figure 11:
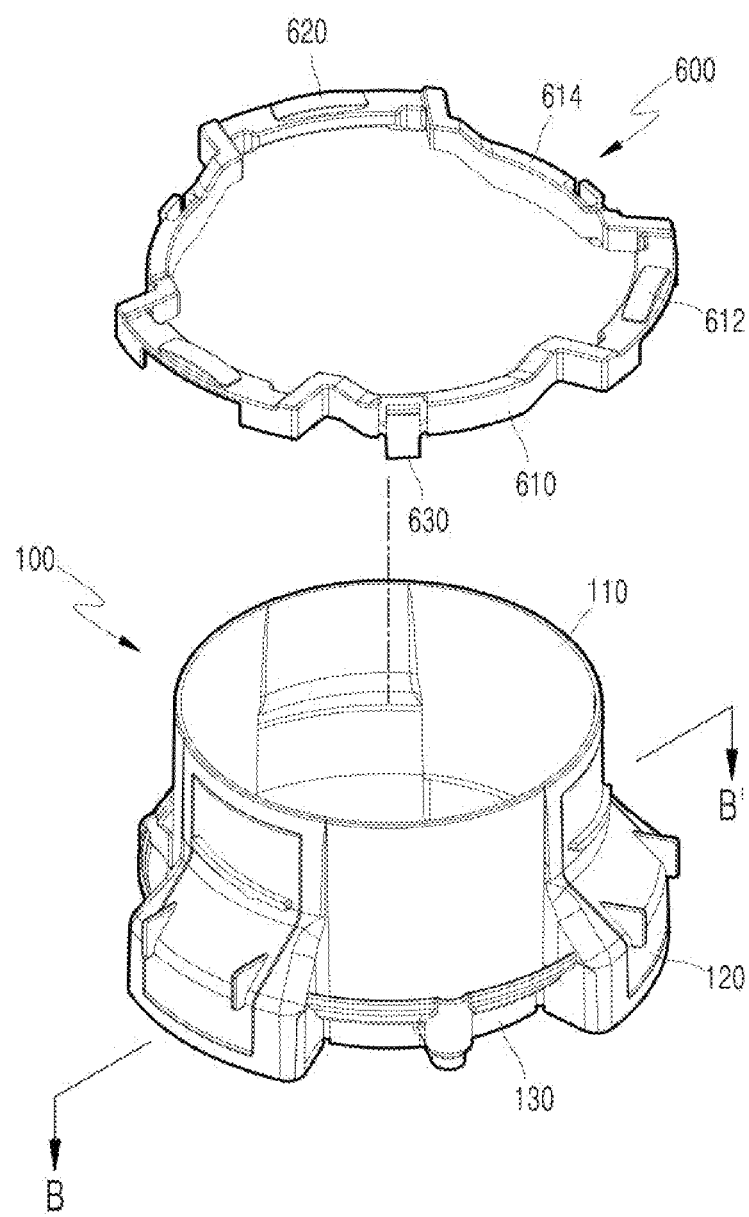
FIG. 11 is a perspective view illustrating a flow guide and a lighting module in a vacuum cleaner according to an embodiment of the present disclosure.
Figure 12:
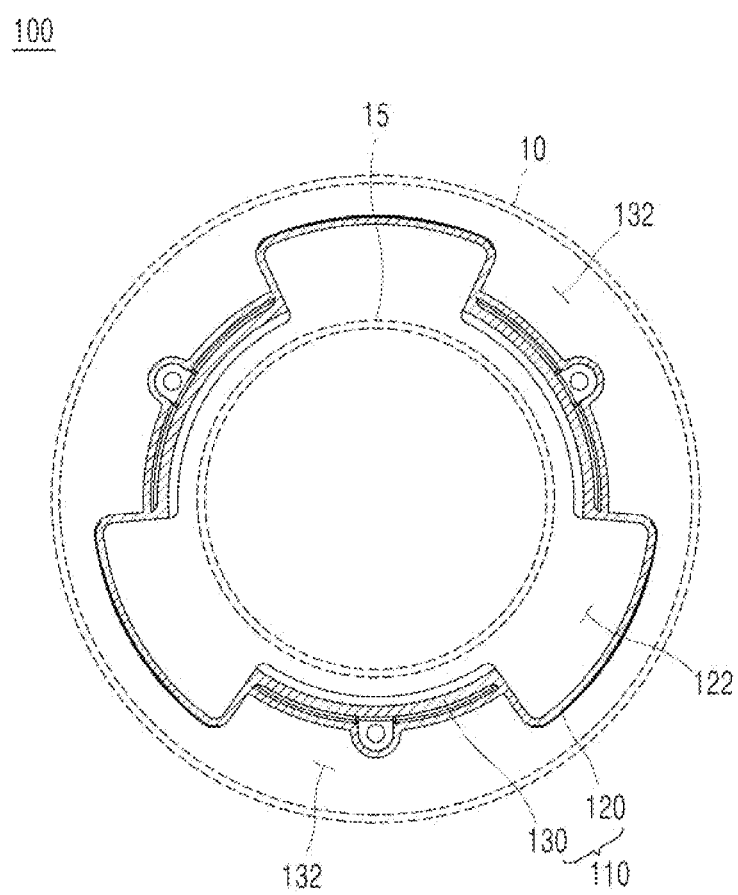
FIG. 12 is a cross-sectional view taken along line B-B' of FIG. 11.
Figure 13:
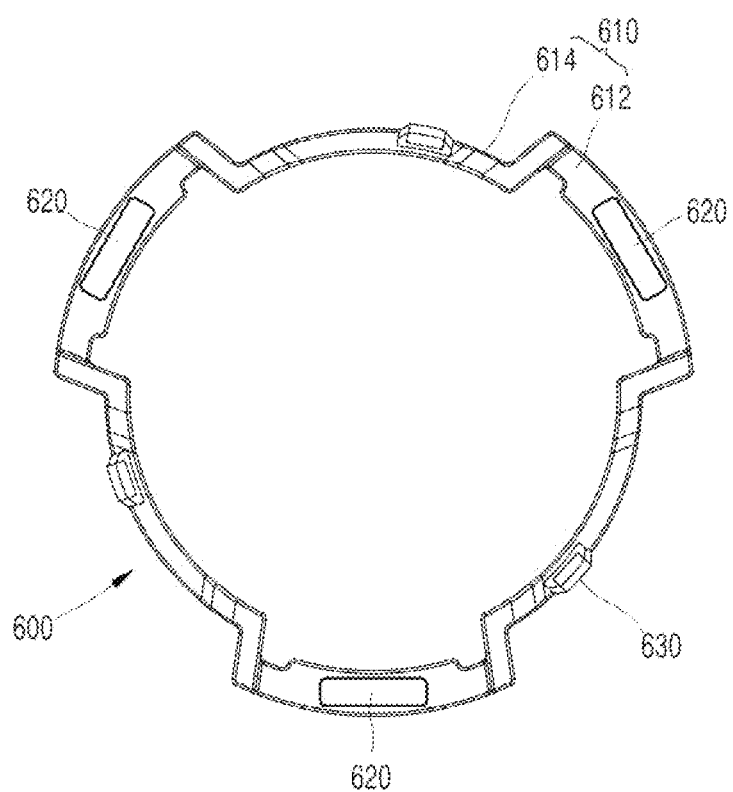
FIG. 13 is a plan view illustrating a lighting module in a vacuum cleaner according to an embodiment of the present disclosure.

FIG. 11 is a perspective view illustrating the flow guide 100 and the lighting module 600 in the vacuum cleaner 1 according to an embodiment of the present disclosure. FIG. 12 is a cross-sectional view taken along line B-B' of FIG. 11. FIG. 13 is a plan view illustrating the lighting module 600 in the vacuum cleaner 1 according to an embodiment of the present disclosure.

As illustrated in FIGS. 11 to 13, the lighting module 600 may be mounted on the outside of the flow guide 100. The flow guide 100 may be formed by a flow path forming wall 110, and may form a flow path through which air can flow into an inner space and outer space thereof.

Specifically, the flow guide 100 may form a flow path through which air flows through a space of which an outer surface is spaced apart from an inner surface of the body 3. In addition, the flow guide 100 may form a flow path through which air flows through a space of which an inner surface is spaced apart from the motor housing 15.

For smoother air flow, at least two portions of the flow path forming wall 110 forming a boundary of the flow guide 100 may protrude laterally, as illustrated in FIG. 11, Such a protruding portion is referred to as protrusion 120, and a portion between two protrusions 120 is referred to as an inlet 130.

As illustrated in FIG. 12, a space between an inner space of the protrusion 120 and the motor housing 15 is referred to as a first flow path 122. The first flow path 122 may be a path through which air may flow from the second cyclone 300 toward the suction motor 11. In addition, a second flow path 132 may be formed in a space between the flow path forming wall 110 provided with the inlet 130 and the first body 10. The second flow path 132 may be a path through which air passing through the suction motor 11 moves toward the exhaust module 9.

In the flow guide 100, a plurality of protrusions 120 protruding laterally and the inlet 130, which is a recessed portion between the protrusions 120, may be repeatedly arranged.

The lighting module 600 may be formed to have a structural shape corresponding to those of the protrusion 120 and the inlet 130 formed in the flow guide 100. Accordingly, the lighting module 600 may be mounted on the protrusion 120 and the inlet 130 of the flow guide 100.

Specifically, the lighting module 600 may include a lighting frame 610, a protruding coupling portion 612, an inlet coupling portion 614, a light irradiator 620, and a fastening member 630.

The lighting frame 610 may form a frame of the lighting module 600. The lighting frame 61 may be formed in a protruding or recessed shape so as to correspond to the protrusion 120 and the inlet 130 of the flow guide 100, and a portion of the lighting frame 61 that protrudes outward so as to correspond to the protrusion 120 may be the protruding coupling portion 612. In addition, a portion of the lighting frame 610 corresponding to the inlet 130 of the flow guide 100 in terms of shape and position may be the inlet coupling portion 614. The protruding coupling portion 612 and the inlet coupling portion 614 of the lighting frame 610 may be formed to correspond to the protrusion 120 and the inlet 130 of the flow guide 100 in terms of shape, and accordingly the lighting frame 610 may be mounted on the outer circumference of the flow guide 100 so as to be stably coupled thereto.

At least one fastening member 630 may be provided in the inlet coupling portion 614. The fastening member 630 may be coupled to the outside of the flow path forming wall 110 of the flow guide 100, and accordingly the lighting module 600 may be firmly fixed to the flow guide 100.

In addition, the light irradiator 620 may be provided on an upper surface of the protruding coupling portion 612. A plurality of light irradiators 620 may be provided. The light irradiators 620 may radiate light upward. Light irradiator 620 may be implemented as an LED module or a UV-LED module having a disinfection function.

The battery 42 accommodated in the battery housing 40 may supply electrical energy to the suction motor 11, the dust separation module 26, and the lighting module 600. In addition, a controller may control all operations of the suction motor 11, the dust separation module 26, the lighting module 600, and the battery 42 included in the vacuum cleaner 1 according to an embodiment of the present disclosure.

The controller may radiate light to the exhaust filter 530 through the lighting module 600 at predetermined time intervals. Alternatively, when a voltage value of the battery 42 is greater than a predetermined voltage value, the controller may set the lighting module 600 to radiate light at all times.

Alternatively, when the vacuum cleaner 1 according to an embodiment of the disclosure is being charged, the lighting module 600 may radiate light at a predetermined time interval to disinfect the exhaust filter 530.

Figure 14:
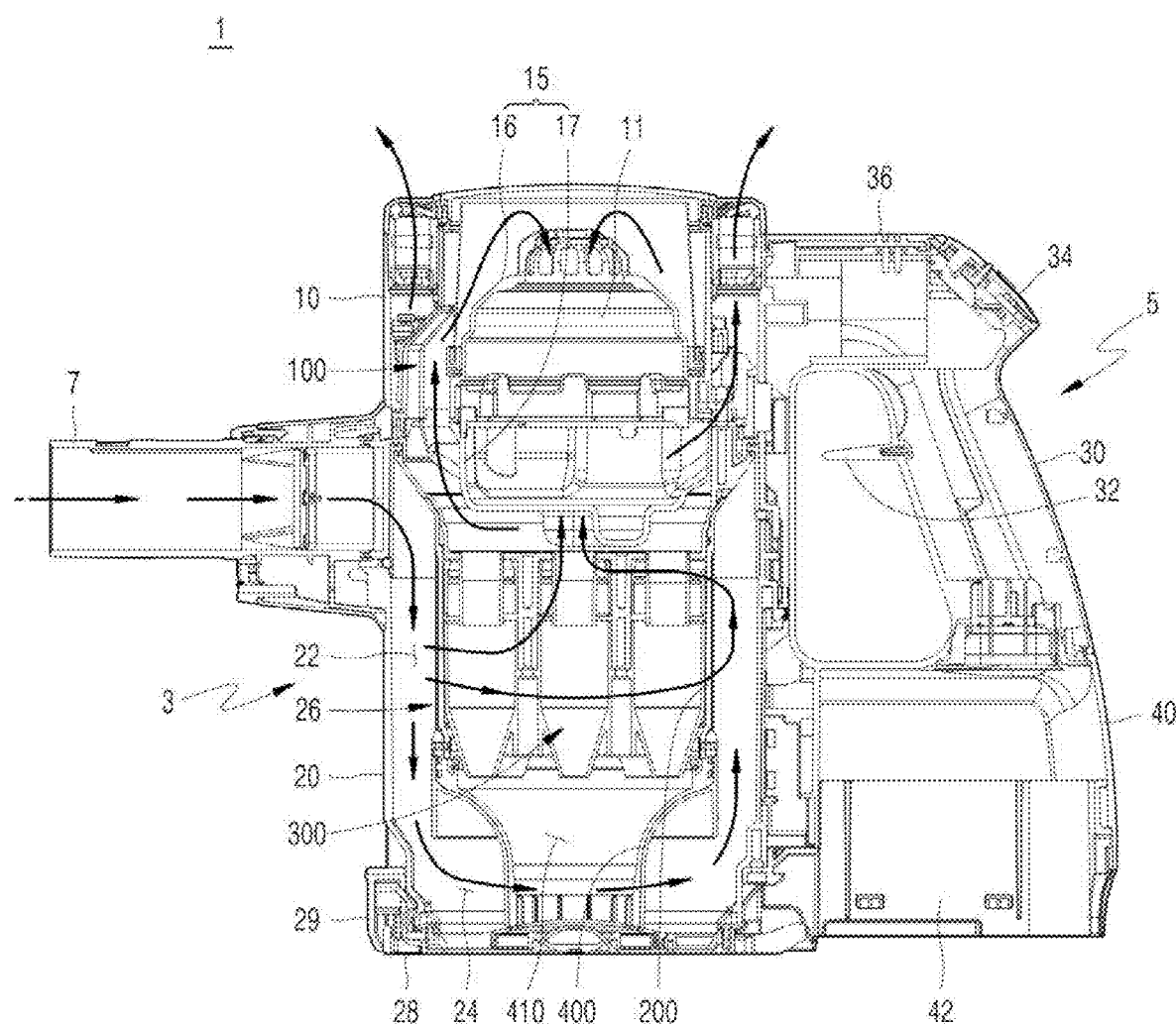
FIG. 14 is a schematic view illustrating a flow of air flowing into a body in a vacuum cleaner according to an embodiment of the present disclosure as a cross-sectional view taken along line A-A' of FIG. 1.

FIG. 14 is a schematic view illustrating flow of air flowing into the body 3 of the vacuum cleaner 1 according to an embodiment of the present disclosure as a cross-sectional view taken along line A-A' of FIG. 1.

As illustrated in FIG. 14, when the suction motor 11 operates, external air may be introduced through the suction inlet 7 provided on one side of the body 3. Here, an air suctioning force may suction not only air but also foreign substances such as surrounding dust. In the first cyclone 22, the air suctioned into the suction inlet 7 may be separated from the foreign substances by a main filter 220. Here, the foreign substances separated from the air may be collected in the first storage 24. The air passing through the main filter 220 may move to the second cyclone 300, and the second cyclone 300 may separate foreign substances from the air again. The foreign substances separated by the second cyclone 300 may be collected in the second storage 410 that is an inner space of the storage unit 400.

The air passing through the second cyclone 300 may pass through the suction motor 11 through a flow path formed by the flow guide 100 and the motor housing 15, and the air passing through the suction motor may be discharged to the outside of the body 3 through the exhaust module 9.

The present disclosure has been described with reference to the illustrated drawings, but the present disclosure is not limited to the disclosed embodiments and the drawings. It should be obvious to those skilled in the art that various modifications may be made within the scope of the present disclosure. In addition, even though operational effects according to a configuration of the present disclosure have not been explicitly described while describing the embodiments of the present disclosure, it should be appreciated that effects predictable from the configuration can also obtained.

What is claimed is:

1. A vacuum cleaner comprising:
   a body including a space configured to allow air to flow therethrough;
   a suction inlet configured to introduce the air into the body;
   a suction motor provided in the body;
   a dust separation module provided in the body and arranged between the suction inlet and the suction motor;
   an exhaust module configured to discharge the air passing through the suction motor from the body, the exhaust module including at least one exhaust filter comprising a photocatalyst;
   a lighting module provided in the body and configured to radiate light toward the at least one exhaust filter; and
   a flow guide comprising a flow path forming wall installed in the body to guide at least two paths of the air moving from the suction inlet to the exhaust module,
   wherein the lighting module comprises a lighting frame that forms a closed curve and is placed on the outer surface of the flow guide, and
   wherein the dust separation module includes a filter unit configured to separate foreign substances from the air received from the suction inlet.

2. The vacuum cleaner of claim 1, wherein the body comprises a motor housing including a predetermined space configured to form an air flow path, the motor housing configured to accommodate the suction motor, and
   wherein the air passing through the dust separation module rises upward along an outer surface of the motor housing and flows through the motor housing toward the suction motor.

3. The vacuum cleaner of claim 2, wherein the body comprises the flow guide coupled to an outer surface of the motor housing, the flow guide configured to form the air flow path between the outer surface of the motor housing and the flow guide.

4. The vacuum cleaner of claim 3, wherein the flow guide comprises:
   the flow path forming wall configured to divide a space between the body and the motor housing;
   at least two protrusions forming a part of the flow path forming wall, the at least two protrusions configured to protrude outward forming a first air flow path in the flow path forming wall; and
   an inlet configured to form a valley between the protrusions, the valley forming a second air flow path between the flow guide and the body.

5. A vacuum cleaner of claim 4, wherein the lighting module is coupled to the outside of the flow guide and configured to radiate light toward an intake port of the exhaust module from a lower portion of the exhaust module.

6. The vacuum cleaner of claim 4, wherein the lighting frame comprises:
   a plurality of protruding coupling portions, a number of the protruding coupling portions corresponding to the number and shape of the protrusions in the flow guide;
   an inlet coupling portion arranged between adjacent protruding coupling portions, the inlet coupling portion corresponding to the inlet in the flow guide; and
   a light irradiator provided on an upper surface of at least one of the protruding coupling portions and configured to radiate light upward.

7. The vacuum cleaner of claim 6, wherein the inlet coupling portion comprises a fastening member coupled to the inlet of the flow guide.

8. The vacuum cleaner of claim 1, wherein the at least one exhaust filter comprises a visible light photocatalyst.

9. The vacuum cleaner of claim 1, wherein the exhaust module comprises:
   a basic filter including a HEPA filter; and
   the at least one exhaust filter,
   wherein the basic filter and the at least one exhaust filter are stacked on each other.

10. The vacuum cleaner of claim 9, wherein the at least one exhaust filter is arranged on a lower portion of the basic filter.

11. A vacuum cleaner comprising:
    a body provided with a suction motor and configured to suction surrounding air;
    a dust separation module provided in the body, the dust separation module configured to separate foreign substances from the air suctioned into the body;
    an exhaust module forming a passage through which the air is discharged from the body, the exhaust module comprising an exhaust filter subjected to a photocatalytic treatment;
    a lighting module provided in the body and configured to radiate light toward the exhaust filter;
    a battery configured to supply electrical energy to the suction motor, the dust separation module, and the lighting module; and
    a controller configured to control operations of the suction motor, the dust separation module, the lighting module, and the battery,
    wherein the controller is configured to turn on the lighting module at predetermined time intervals while the battery is being charged, and
    wherein the lighting module comprises a lighting frame forming a closed curve, and
    wherein the dust separation module includes a filter unit configured to separate foreign substances from the air received from the suction motor.

12. The vacuum cleaner of claim 11, wherein the controller is configured to adjust the lighting module to radiate light at all times when a voltage value of the battery is greater than a predetermined voltage value.

13. The vacuum cleaner of claim 11, wherein the body includes:
    a motor housing configured to accommodate the suction motor; and
    a flow guide coupled to an outer surface of the motor housing, the flow guide forming an air flow path between the outer surface of the motor housing and the flow guide.

14. The vacuum cleaner of claim 13, wherein the air flow path includes a first air flow path and a second air flow path and the flow guide includes a wall configured to divide a space between the body and the motor housing, the wall including:
- at least two protrusions extending radially towards the body, the at least two protrusions defining the first air flow path; and
- a valley formed between the at least two protrusions, the valley defining the second air flow path.

15. A vacuum cleaner of claim 14, wherein the lighting module is coupled to the outside of the flow guide and configured to radiate light toward an intake port of the exhaust module.

16. The vacuum cleaner of claim 14, wherein the lighting frame includes:
- a plurality of coupling portions, a number of the coupling portions corresponding to a number and a shape of the protrusions in the flow guide;
- an inlet coupling portion arranged between adjacent coupling portions, the inlet coupling portion corresponding to the valley in the flow guide; and
- a light irradiator provided on an upper surface of at least one of the coupling portions and configured to radiate light.

17. The vacuum cleaner of claim 16, wherein the inlet coupling portion includes a fastening member coupled to the valley of the flow guide.

* * * * *